(12) United States Patent
Ma

(10) Patent No.: US 12,098,773 B2
(45) Date of Patent: Sep. 24, 2024

(54) CORE SEAT FOR A VALVE CORE AND A VALVE CORE MODULE

(71) Applicant: Ningbo Wanhai Cartridge Technology Co., Ltd., Ningbo (CN)

(72) Inventor: Yonghua Ma, Ningbo (CN)

(73) Assignee: Ningbo Wanhai Cartridge Technology Co., Ltd., Ningbo (CN)

( * ) Notice: Subject to any disclaimer, the term of this patent is extended or adjusted under 35 U.S.C. 154(b) by 0 days.

(21) Appl. No.: 17/905,882

(22) PCT Filed: Mar. 16, 2022

(86) PCT No.: PCT/CN2022/081115
§ 371 (c)(1),
(2) Date: Sep. 8, 2022

(87) PCT Pub. No.: WO2023/000691
PCT Pub. Date: Jan. 26, 2023

(65) Prior Publication Data
US 2024/0229943 A1    Jul. 11, 2024

(30) Foreign Application Priority Data

Jul. 22, 2021  (CN) .......................... 202110832281.7

(51) Int. Cl.
*F16K 11/078*    (2006.01)
*F16K 27/04*    (2006.01)

(52) U.S. Cl.
CPC ........ *F16K 11/0787* (2013.01); *F16K 27/045* (2013.01)

(58) Field of Classification Search
CPC ............... F16K 11/0787; F16K 27/045; F16K 11/0785; Y10T 137/86525;
(Continued)

(56) References Cited

U.S. PATENT DOCUMENTS 2,364,697 A  * 12/1944  Daniels ............... F16K 11/0743
                                                                251/283
6,883,541 B2 *  4/2005  Hwang ................. F16K 11/076
                                                                137/637.4
(Continued)

FOREIGN PATENT DOCUMENTS

WO    WO-2009091135 A2 *  7/2009  .......... F16K 11/0787

*Primary Examiner* — Jessica Cahill
(74) *Attorney, Agent, or Firm* — Wang Law Firm, Inc.

(57) ABSTRACT

The present invention disclosed a core seat for a valve core, the core seat comprises a base (9) with a total water outlet passage (9a), a first transition water outlet passage (9b) and a second transition water outlet passage (9c); and an electric control switch (13), the second transition water outlet passage (9c) is in communication with the total water outlet passage (9a), the electric control switch (13) controls communication between the first transition water outlet passage (9b) and the total water outlet passage (9a); the core seat provides the possibility that a tap using the core seat can be switched into an ordinary tap for use after an electric control switch is damaged. The present invention disclosed a valve core module which comprises a water path switching valve core and the core seat, a tap using the valve core module can be switched to an ordinary tap for use after the electric control switch is damaged.

3 Claims, 11 Drawing Sheets

(58) Field of Classification Search
CPC ..... Y10T 137/86718; Y10T 137/86726; Y10T 137/86759; Y10T 137/86791; Y10T 137/87249; Y10T 137/9464
See application file for complete search history.

(56) References Cited

U.S. PATENT DOCUMENTS

| | | | |
|---|---|---|---|
| 7,389,793 B2* | 6/2008 | Wang | F16K 27/048 |
| | | | 137/597 |
| 7,584,898 B2* | 9/2009 | Schmitt | G05D 23/1393 |
| | | | 236/12.12 |
| 2001/0011558 A1* | 8/2001 | Schumacher | F16K 27/048 |
| | | | 137/613 |
| 2007/0044850 A1* | 3/2007 | Pieters | F16K 11/0787 |
| | | | 137/597 |

* cited by examiner

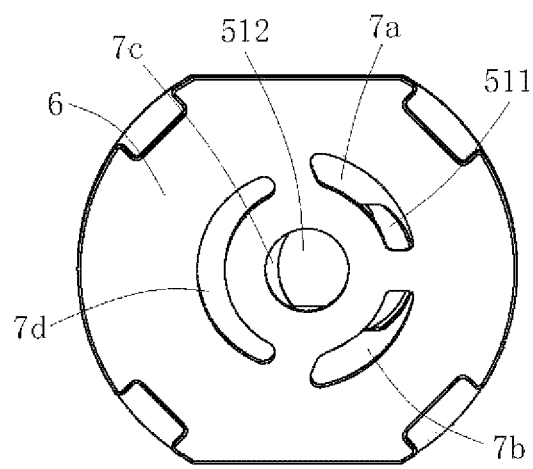 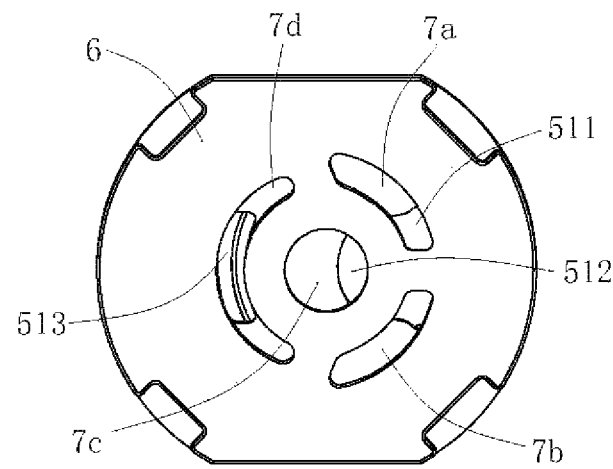
FIG. 14  FIG. 15
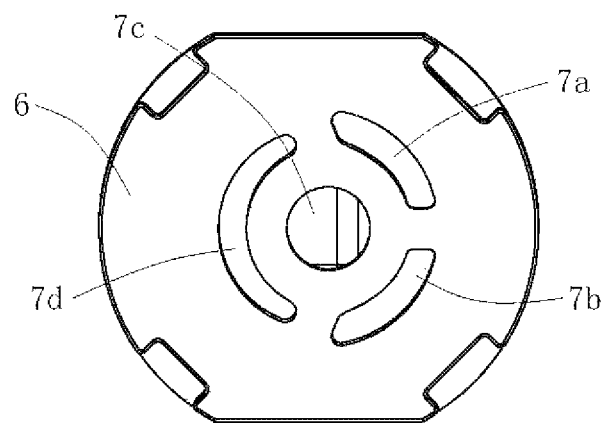
FIG. 16

CORE SEAT FOR A VALVE CORE AND A VALVE CORE MODULE

TECHNICAL FIELD OF THE INVENTION

The present invention belongs to the technical field of taps for automatically controlling water outlet (induction water outlet), and in particular, relates to a core seat for a valve core for automatically controlling a water outlet tap, and further relates to a valve core module having the core seat and having both a water mixing (controlling the turning on and off of a water inlet path, and adjusting the water temperature) function and a water distribution (distributing a water outlet channel of a water flow) function.

BACKGROUND OF THE INVENTION

Currently, there are mainly two methods for controlling water outlet of taps: one method is to manually control water outlet via a handle; and the other method is to receive and send a signal via an induction assembly, and then to control an electric control switch, such as a solenoid valve switch, thereby controlling the water outlet. An induction tap can realize the turning on or off thereof without contacting the tap body, and thus the induction tap is not only convenient to use, but also facilitates keeping the tap surface clean. There are two modes of induction taps. One mode is a long-duration water outlet mode, in which the tap is turned on by induction once, and the tap is turned off by induction again. The other mode is an induction water outlet mode, in which a condition for turning on the tap is set, and the tap is turned on if the condition is satisfied, and the tap is turned off if the condition is not satisfied. For example, the tap is turned on if an object is induced at a predetermined position, and the tap is turned off when no object is induced at the predetermined position; or the tap is turned on upon detection that a tap handle or a water outlet leaves a predetermined position, and the tap is turned off upon detection that the tap handle or the water outlet is at the predetermined position.

No matter what kind of induction tap is used, there are the following disadvantages: when a solenoid valve switch is damaged, induction water outlet cannot be achieved or the tap is always kept in a constant water flowing state, and the tap cannot be used normally, and thus the tap needs to be replaced, thereby increasing the use cost.

There are also some induction taps in combination with valve cores. The valve core is a multi-functional valve core, and the multi-functional valve core can adjust water temperature and turn off a water path. For example, a Chinese patent CN112963608A (Patent No.: CN202110341610.8) titled an induction tap and control method thereof discloses the structure of such an induction tap. However, the described induction tap still has the defect that induction water outlet cannot be achieved after the solenoid valve switch is damaged.

Tap valve cores can be divided into two main categories according to functions: one type is a water mixing valve core for controlling the turning on or off of water inlet paths of cold water and hot water and adjusting the water temperature, and some water mixing valve cores can also adjust the amount of water; and the other type is a water distribution valve core which can control the water flow direction and distributing a water outlet channel of a water flow.

Currently, there are also tap valve cores which combine functions of the two valve cores into one, such as the Chinese patent CN102644766B (patent No.: CN 201210101026.6) titled multifunction ceramic valve core with function of water distribution and water mixing discloses such a valve core. In said patent, the turning off of first and second water outlets, or selective communicating of the first and second water outlets is achieved only by means of a ceramic rotor, that is, the first and second water outlets can only have one allowing for water circulation, or neither of the first and second water outlets allows for water circulation. Furthermore, the ceramic rotor achieves a water distribution function by means of selective communicating between a flow mixing chamber therein and the first water outlet or the second water outlet.

SUMMARY OF THE INVENTION

It is a first object of the present invention to provide a core seat for a valve core for an induction tap, which provides the possibility that a tap using the core seat can be switched into an ordinary tap for use after an electric control switch is damaged, so that the tap can still be used normally after the electric control switch is damaged.

For achieving the first object, the core seat for a valve core, comprises a base with a total water outlet passage, a first transition water outlet passage and a second transition water outlet passage; and an electric control switch in communication with the first transition water outlet passage and the total water outlet passage, wherein the second transition water outlet passage is in communication with the total water outlet passage, the electric control switch controls communication between the first transition water outlet passage and the total water outlet passage.

In order to facilitate the direct installation of a water path switching valve core on the base, preferably, the base has a mounting surface on top of the base for connecting to the valve core, the base further has a plurality of initial water inlet passages inside; the first transition water outlet passage, the second transition water outlet passage, the plurality of initial water inlet passages exit through the mounting surface. Certainly, the water path switching valve core may also not be directly mounted on the base, as long as the first transition water outlet passage and the second transition water outlet passage are respectively in communication with a first water outlet passage and a second water outlet passage of the water path switching valve core, and the initial water inlet passages are in communication with water inlet passages of the water path switching valve core, wherein the communication may be a water pipe connection.

In order to conveniently install an electric control switch, preferably, the base has a mounting chamber for receiving the electric control switch; the base has a port connecting the first transition water outlet passage with the total water outlet passage, and located adjacent to the electric control switch; in a normal state, the electric control switch blocks the port to separate the first transition water outlet passage from the total water outlet passage; and when the electric control switch is turned on, the electric control switch unblocks the port to enable the first transition water outlet passage to be in communication with the total water outlet passage. The electric control switch can use the most common solenoid valve switch.

Compared with the prior art, the present core seat for a valve core has the advantages that: the core seat can cooperate with a water path switching valve; in a normal state, water flows through the first transition water outlet passage, and total water outlet is controlled by the electric control switch (such as a solenoid valve switch or an electric switch), so that automatic water outlet (such as induction water outlet) can be realized. If the electric control switch is damaged, the electric control switch always blocks the first transition water outlet passage from the total water outlet passage. In this case, it is only necessary to switch a water path by operating the water path switching valve such that water flows out from the second transition water outlet passage, and a water flow can directly flow out from the total water outlet passage. When water is to be turned off, it is only necessary to operate the water path switching valve to block the second transition water outlet passage. Therefore, the present core seat provides the possibility that a tap using the valve core seat can be switched into an ordinary tap for use after an electric control switch is damaged, so that the tap can still be used normally after the electric control switch is damaged, thereby avoiding the occurrence of embarrassing situations that the tap cannot achieve water outlet and no water is available once the electric control switch is damaged.

It is a second object of the present invention to provide a valve core module for an induction tap. A tap using the valve core module can be switched to an ordinary tap for normal use after an electric control switch is damaged.

For achieving the second object, the valve core module comprises a water path switching valve core and the core seat; wherein, the water path switching valve core comprises a housing, a plurality of inlet passages, a first outlet passage, a second outlet passage; a plurality of plates and a handle for controlling the movement of the plates are disposed inside the housing, through operating the handle, a water flow is controlled to flow from the first water outlet passage and/or the second water outlet passage; the housing is connected to on the base of the core seat, the first outlet passage is in communication with a first transition water outlet passage, and the second outlet passage is in communication with a second transition water outlet passage.

In order to facilitate the direct installation of the water path switching valve core on the base, the base has a mounting surface on the top of the base, and the housing is connected to the mounting surface; the first transition water outlet passage and the second transition water outlet passage run through the mounting surface; and the ends of the first water outlet passage and the second water outlet passage are located at the bottom surface of the housing. The mounting surface further has two positioning holes, and the bottom of the valve housing has a plurality of positioning columns matching the positioning holes. After the water path switching valve core is positioned on the mounting surface, then it is only necessary to press the water path switching valve core and the valve core seat as a whole into a housing of a tap. Water outlets of the first outlet passage and the second outlet passage are disposed on the bottom surface of the housing, so that the connections between the water outlet passages and the transition water outlet passages do not require additional water pipe connection, and the whole structure is compact and reliable.

Preferably, the base further has a plurality of initial water inlet passages, and the initial water inlet passages runs through the valve core mounting surface; and the end of the water inlet passage is located on the bottom surface of the housing, and the plurality of initial water inlet passages are in communication with the plurality of inlet passages. The provision of the initial water inlet passages on the base can make the overall structure more compact, it is not necessary to provide a water inlet passage in another position, and internal pipe connection of a tap using the valve core module is more convenient.

In order to enable the switching valve core to also have a water mixing function (a water temperature adjustment function), preferably, the plurality of initial water inlet passages are composed of a first initial water inlet passage and a second initial water inlet passage; the plurality of inlet passages are composed of a first inlet passage and a second inlet passage; the first initial water inlet passage is in communication with the first inlet passage, and the second initial water inlet passage is in communication with the second inlet passage; the plate has a water mixing chamber, and movement of the plate enables the water mixing chamber to communicate with the first inlet passage and/or the second inlet passage. That is, the present switching valve core has the functions of both water mixing and water distributing. Such a valve core may have various forms on the market, may be a biaxial valve core, and reference can be made to the patents in the Background; and may also be a uniaxial valve core, and reference can be made to a series of patents previously filed by the applicant.

Preferably, the water path switching valve core further comprises a rotor and a dial mounted in the housing, the plate comprise a movable plate and a fixed plate; the dial is constrained at the bottom of the rotor to rotate along with the rotor and can slide relative to the rotor, the movable plate is fixed on the bottom surface of the dial, and the fixed plate is fixed on the bottom of the housing; the first inlet passage, the second inlet passage, the first outlet passage and the second outlet passage are disposed on the bottom of the housing and the fixed plate; the movable plate internally has a water mixing chamber, and the bottom surface of the movable plate has a water mixing inlet, a first water mixing outlet and a second water mixing outlet in communication with the water mixing chamber; the rotation of the movable plate is capable of enabling the water mixing chamber to be in communication with the first inlet passage and/or the second inlet passage through the water mixing inlet; the first water mixing outlet is always in communication with the first water outlet passage, the sliding of the movable plate is capable of determining whether the second water mixing outlet is in communication with the second water outlet passage, and determining whether the movable plate blocks the first inlet passage and the second inlet passage.

The structure enables the sliding of the movable valve plate to achieve two positions. A first position is that the first water mixing outlet is in communication with the first outlet passage, and the second water mixing outlet is blocked from being in communication with the second outlet passage by the movable plate, and in this state, water outlet is only performed in the first outlet passage; a second position is that the second water mixing outlet is in communication with the second outlet passage, and the first water mixing outlet is always in communication with the first outlet passage, and in this state, water outlet is performed in both the first outlet passage and the second outlet passage; and a third position is that the movable plate blocks the first inlet passage and the second inlet passage, and at this time, water outlet is performed in neither the first outlet passage nor the second outlet passage, which is different from a conventional manner for blocking the first outlet passage and the second outlet passage.

As a preferable layout, when the movable plate is in a middle position state, the bottom surface of the movable plate does not block the first inlet passage and the second inlet passage, and the rotation of the movable plate is capable of enabling the water mixing chamber to be in communication with the first inlet passage and/or the second inlet passage, and the bottom surface of the movable plate blocks the communication between the second water mixing outlet and the second outlet passage;

when the movable plate slides from the middle position to one side direction, the bottom surface of the movable plate blocks both the first inlet passage and the second inlet passage, and both the first inlet passage and the second inlet passage are blocked from the water mixing inlet;

when the movable plate slides from the middle position to the other side direction, the bottom surface of the movable plate does not block the first inlet passage and the second inlet passage, and the rotation of the movable plate is capable of enabling the water mixing chamber to be in communication with the first inlet passage and/or the second inlet passage, and enabling the second water mixing outlet to be in communication with the second outlet passage.

By means of said layout, the present valve core has three clear and definite operation positions. A first position is a middle position, and at this position, mixed water passes through the water mixing chamber and the first water mixing outlet, and then flows out from the first outlet passage, and the rotation of the movable plate can adjust the temperature of a water flow; a second position is that the movable plate slides from the middle position to one side, and at this position, as the bottom surface of the movable plate blocks both the first inlet passage and the second inlet passage, no water flows out from the first outlet passage and the second outlet passage, thereby being in a water flow turning-off state at this time; and a third position is that the movable plate slides from the middle position to the other side, and mixed water flows out from two paths, one path is to pass through the water mixing chamber and the first water mixing outlet and then to flow out from the first outlet passage, and the other path is to pass through the water mixing chamber and the second water mixing outlet and then to flow out from the second outlet passage, and the rotation of the movable plate can adjust the temperature of a water flow.

In order to ensure that the movable plate slides steadily in the radial direction relative to the rotor, preferably, the top surface of the dial further has a guide boss, the bottom of the rotor has a guide groove matching the guide boss, and the guide boss is disposed in the guide groove and is capable of sliding therein; and the guide boss cooperates with the guide groove to achieve sliding guide.

Preferably, a plurality of first columns having peripheral wall portions exposed are inserted onto the front wall and the rear wall of the guide boss, and a plurality of second columns having peripheral wall portions exposed are inserted onto the front inner wall and the rear inner wall of the guide groove; the first columns need to pass over the second columns, so that the movable plate is capable of entering from one side position to the other side position. The first columns and the second columns are partially staggered, and a certain force is required to enable the first columns to pass over the second columns. The structure provides a certain hand feeling in the process of switching from a single water passage flowing to a double water passage water flowing, and when entering from one position to another position, a certain force is required to drive a valve handle, achieving good hand feeling; in addition, a user is also explicitly instructed to perform mode switching at which position.

Compared with the prior art, the advantages of the present valve core module is that: a tap using the valve core module can be switched to an ordinary tap for use after the electric control switch is damaged. In a normal state, the water path switching valve core is switched so that a water flow flows out via the first outlet passage and the first transition water outlet passage; and in this case, the total water outlet is controlled by the electric control switch (for example, a solenoid valve switch), which can achieve automatic water outlet (for example, induction water outlet). If the electric control switch is damaged, the electric control switch always blocks the first transition water outlet passage from the total water outlet passage. In this case, it is only necessary to switch the water path by operating the water path switching valve, such that a water flow flows via the second outlet passage and then flows out from the second transition water outlet passage; and the second transition water outlet passage is directly in communication with the total water outlet passage, and thus water can directly flow out from the total water outlet passage. When water is to be turned off, it is only necessary to operate the water path switching valve to block the second transition water outlet passage.

BRIEF DESCRIPTION OF THE DRAWINGS

FIG. 14 is a bottom view of the water path switching valve core after the housing is removed according to the embodiment of the present invention (in a state when the handle does not swing);

FIG. 15 is a bottom view of the water path switching valve core after the housing is removed according to the embodiment of the present invention (in a state when the handle swings to the left);

FIG. 16 is a bottom view of the water path switching valve core after the housing is removed according to the embodiment of the present invention (in a state when the handle swings to the right);

DETAILED DESCRIPTION OF THE INVENTION

Figure 1:
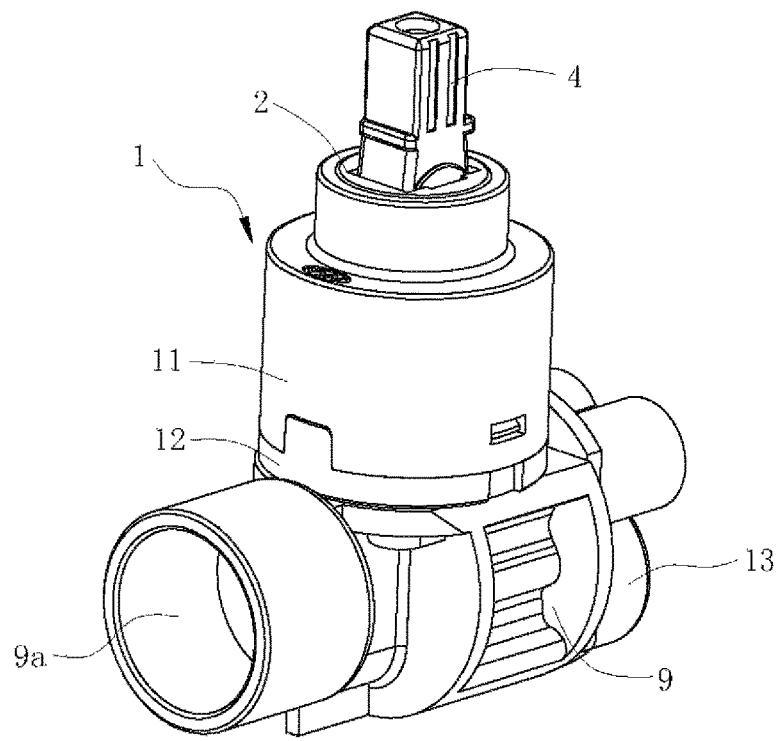
FIG. 1 is a perspective view I of a valve core module according to an embodiment of the present invention.
Figure 2:
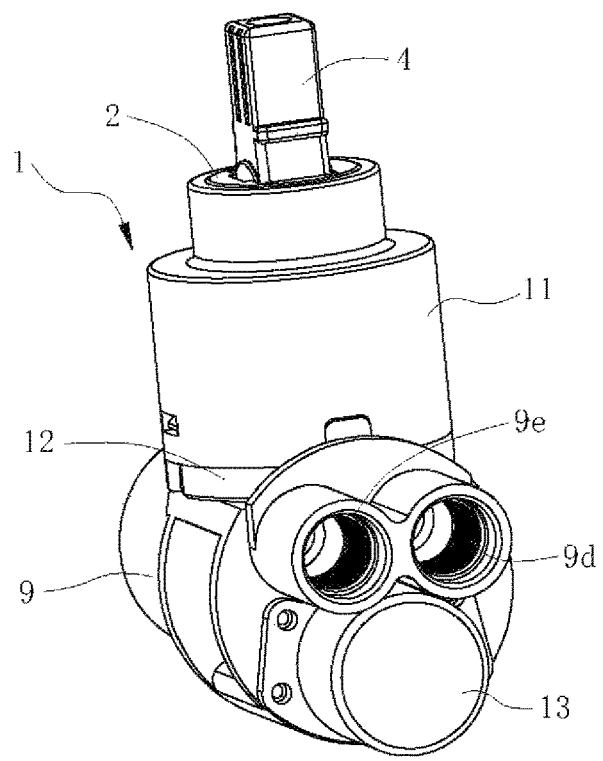
FIG. 2 is a perspective view II of the valve core module according to the embodiment of the present invention.
Figure 3:
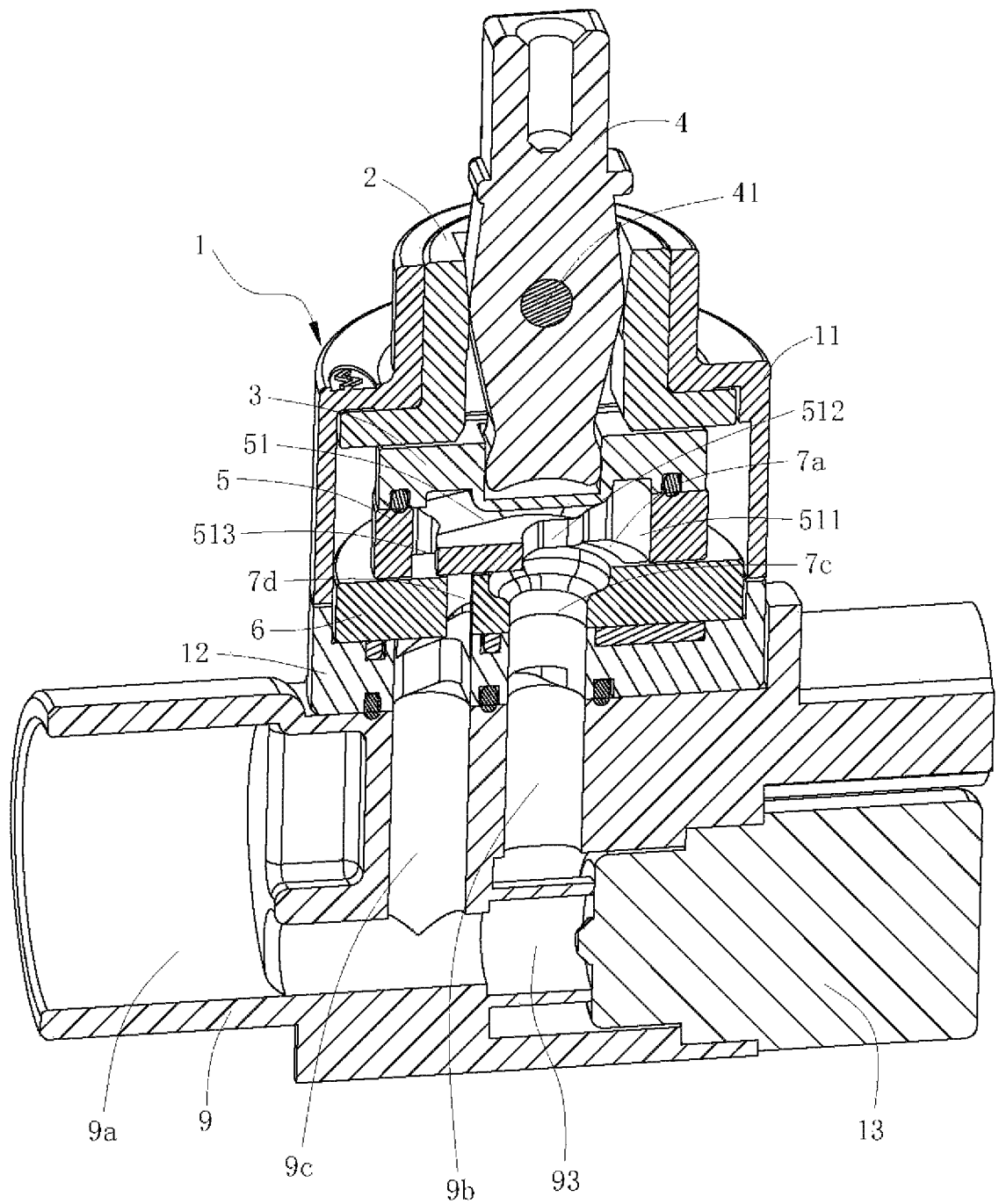
FIG. 3 is a sectional view of the valve core module according to the embodiment of the present invention (an automatic water outlet state)
Figure 4:
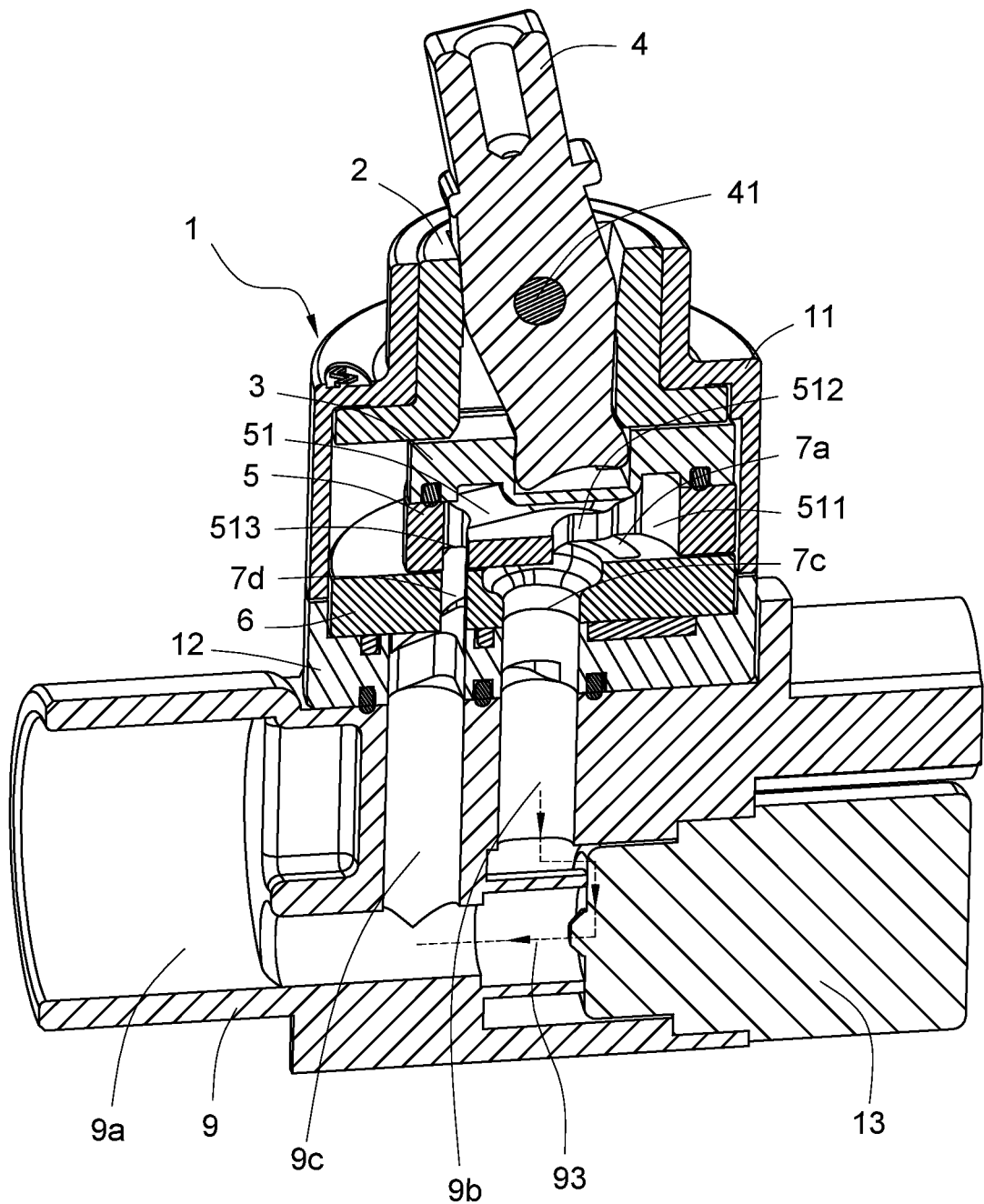
FIG. 4 is a sectional view of the valve core module according to the embodiment of the present invention (a manual water outlet state)
Figure 5:
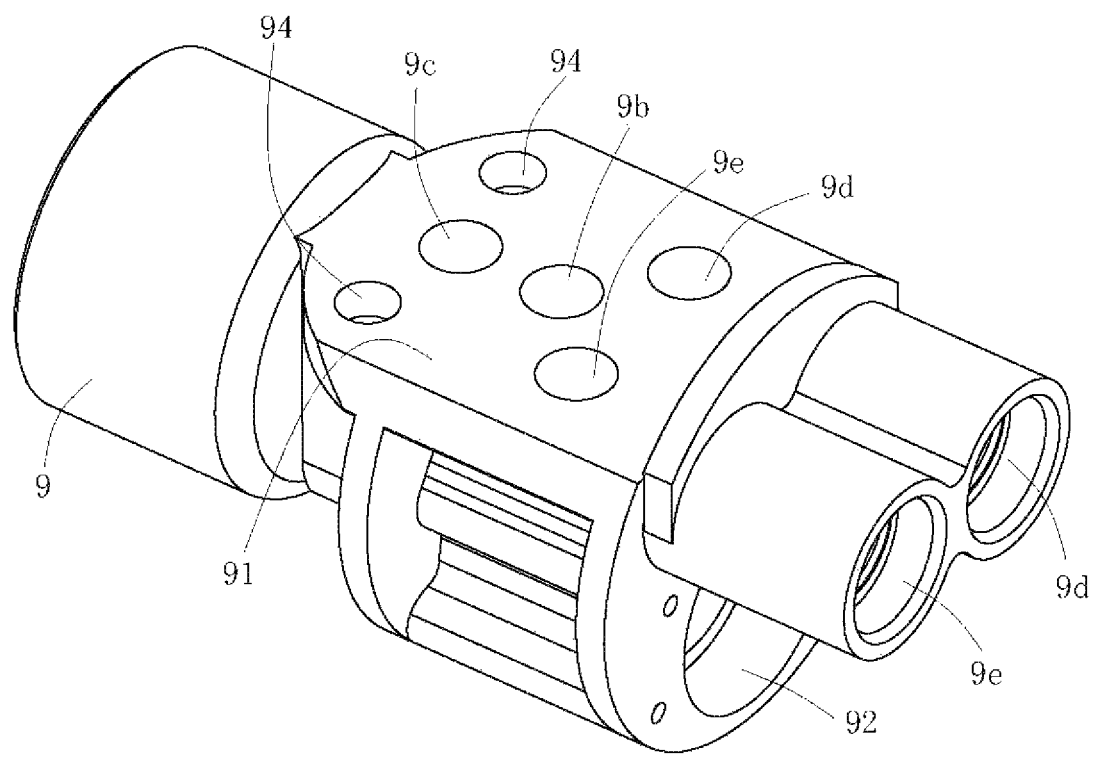
FIG. 5 is a perspective view of a base of the valve core module according to the embodiment of the present invention.
Figure 6:
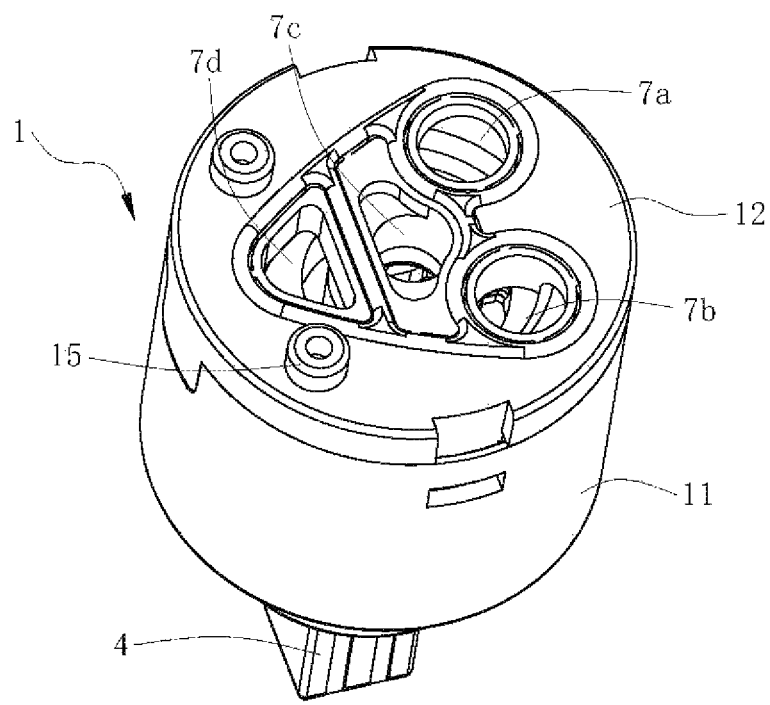
FIG. 6 is a perspective view of a water path switching valve core according to the embodiment of the present invention.

The present invention will be further described in detail with reference to the accompanying drawings by embodiments.

The embodiments of a core seat for a valve core are described accompanying a valve core module. FIGS. 1 to 19 show a preferred embodiment of the valve core module.

The valve core module comprises a water path switching valve core. The water path switching valve core comprises a housing 1, a handle 4, and a rotor 2, a dial 3, a movable plate 5 and a fixed plate 6 disposed in the housing; the dial 3 is constrained at the bottom of the rotor 2 to rotate along with the rotor 2 and can slide relative to the rotor 2, the movable plate 5 is fixed on the bottom surface of the dial 3, the middle part of the handle 4 is rotatably connected to the rotor 2 through a pin shaft 41, the upper end of the handle 4 extends out of the top of the housing 1, and the lower end of the handle 4 is inserted into a recessed chamber 32 at the top of the dial 3.

The bottom of the housing 1 and the fixed plate 6 are both have a first inlet passage 7a, a second inlet passage 7b, a first outlet passage 7c and a second outlet passage 7d of which the positions correspond to each other. The housing 1 is formed by clamping an upper housing 11 and a housing base 12, the housing base 12 forms the bottom of the housing 1, the fixed plate 6 is clamped on the housing base 12, and a second sealing member 14b is arranged between the fixed plate 6 and the housing base 12.

The movable plate 5 internally has a water mixing chamber 51, and the bottom surface of the movable plate 5 has a water mixing inlet 511, a first water mixing outlet 512 and a second water mixing outlet 513 in communication with the water mixing chamber 51; the rotation of the movable plate 5 is capable of enabling the water mixing chamber 51 to be in communication with the first inlet passage 7a and/or the second inlet passage 7b through the water mixing inlet 511; the first water mixing outlet 512 is always in communication with the first water outlet passage 7c, the sliding of the movable plate 5 is capable of determining whether the second water mixing outlet 513 is in communication with the second water outlet passage 7d, and determining whether the movable plate 5 blocks the first inlet passage 7a and the second inlet passage 7b.

When the movable plate 5 is in a middle position state, the bottom surface of the movable plate 5 does not block the first inlet passage 7a and the second inlet passage 7b, and the rotation of the movable plate 5 is capable of enabling the water mixing chamber 51 to be in communication with the first inlet passage 7a and/or the second inlet passage 7b, and the bottom surface of the movable plate 5 blocks the communication between the second water mixing outlet 513 and the second outlet passage 7d.

When the movable plate 5 slides from the middle position to one side direction (the left side in the direction shown in the figures), the bottom surface of the movable plate 5 blocks both the first inlet channel 7a and the second inlet channel 7b, and both the first inlet channel 7a and the second inlet channel 7b are blocked from the water mixing inlet 511.

When the movable plate 5 slides from the middle position to the other side direction (the right side in the direction shown in the figures), the bottom surface of the movable plate 5 does not block the first inlet channel 7a and the second inlet channel 7b; and the rotation of the movable plate 5 can enable the water mixing chamber 51 to be in communication with the first water inlet passage 7a and/or the second inlet passage 7b, and enable the second water mixing outlet 513 to be in communication with the second outlet channel 7d.

The top surface of the dial 3 further has a guide boss 31, the bottom of the rotor 2 has a guide groove 21 matching the guide boss 31, and the guide boss 31 is disposed in the guide groove 21 and is capable of sliding therein; a plurality of first columns 8a having peripheral wall portions exposed are inserted onto the front wall and the rear wall of the guide boss 31, and a plurality of second columns 8b having peripheral wall portions exposed are inserted onto the front inner wall and the rear inner wall of the guide groove 21; the first columns 8a need to pass over the second columns 8b, so that the movable plate 5 is capable of entering from one side position to the other side position.

The first water mixing outlet 512 is arranged at the center position of the bottom surface of the movable plate 5, the water mixing inlet 511 is located at one side of the first water mixing outlet 512, and the bottom surfaces of the water mixing inlet and the water mixing outlet are directly in communication with each other. The second water mixing outlet 513 is separated from the first water mixing outlet 512 by a blocking wall 52, and when the blocking wall 52 is in a state of being located above the second outlet passage 7d, the communication between the second water mixing outlet 513 and the second outlet passage 7d is blocked.

The dial 3 is fixed on the top of the movable plate 5 in a snap-fit manner, a first scaling member 14a is arranged between the dial 3 and the movable plate 5, a recessed chamber with an opening at the top is disposed on the movable plate 5, and the bottom surface of the dial 3 covers the opening at the top of the recessed chamber to form the water mixing chamber 51.

The first outlet passage 7c is located at the center, and the first inlet passage 7a, the second inlet passage 7b and the second outlet passage 7d are arranged around the periphery of the first outlet passage 7c.

The side wall of the rotor 2 has two limiting blocks 22 protruding from the sides, the inner top wall of the housing 1 has two radially protruding blocking blocks 10, the two blocking blocks 10 are spaced apart in the circumferential direction, and the limiting blocks 22 are located between the two blocking blocks 10, to limit the rotation angle of the rotor 2.

The valve core module further comprises a core seat for a valve core, the core seat comprising a base 9 with a total water outlet passage 9a, a first transition water outlet passage 9b and a second transition water outlet passage 9c; and an electric control switch 13 in communication with the first transition water outlet passage 9b and the total water outlet passage 9a, wherein the second transition water outlet passage 9c is in direct communication with the total water outlet passage 9a, the electric control switch controls communication between the first transition water outlet passage 9b and the total water outlet passage 9a.

The base 9 has a mounting surface 91 on top of the base 9 for connecting to the valve core, the housing 1 is mounted on the mounting surface 91, the mounting surface 91 further has two positioning holes 94, the bottom of the housing 1 has a plurality of positioning columns 15 matching the positioning holes 94. After the water path switching valve core is positioned on the mounting surface 91, then it is only necessary to press the water path switching valve core and the valve core seat as a whole into a housing of a tap.

The first transition water outlet passage 9b and the second transition water outlet passage 9c run through the mounting surface 91; and the ends of the first water outlet passage 7c and the second water outlet passage 7d are located at the bottom surface of the housing 1. The first outlet passage 7c is in communication with a first transition water outlet passage 9b, and the second outlet passage 7d is in communication with a second transition water outlet passage 9c.

A first initial water inlet passage 9d and a second initial water inlet passage 9e are further disposed in the base 9, the first initial water inlet passage 9d and the second initial water inlet passage 9e both extend through the mounting surface 91, the first initial water inlet passage 9d is in communication with the first inlet passage 7a, and the second initial water inlet passage 9e is in communication with the second inlet passage 7b.

The base 9 has a mounting chamber 92 for receiving the electric control switch 13, the electric control switch 13 is mounted in the mounting chamber 92 by means of a flange structure; the first transition water outlet passage 9b is in communication with the total water outlet passage 9a through a port 93; in a normal state, the electric control switch 13 blocks the port 93 to separate the first transition water outlet passage 9b from the total water outlet passage 9a; and when the electric control switch 13 is turned on, the electric control switch 13 unblocks the port 93 to enable the first transition water outlet passage 9b to be in communication with the total water outlet passage 9a. The electric control switch 13 is preferably a solenoid valve switch, which is a structure most commonly used by existing induction taps.

The principle of the present valve core module is described below:

a tap using the valve core module can be switched to an ordinary tap for use after the electric control switch 13 is damaged. In a normal state, the water path switching valve core is switched so that a water flow flows out through the first outlet passage 7c and the first transition water outlet passage 9b; and in this case, water outlet of the total water outlet passage 9a is controlled by the electric control switch 13 (for example, a solenoid valve switch), which can achieve automatic water outlet (for example, induction water outlet). If the electric control switch 13 is damaged, the electric control switch 13 always blocks the first transition water outlet passage 9b from the total water outlet passage 9a. In this case, it is only necessary to switch the water path by operating the water path switching valve, such that a water flow flows through the second outlet passage 9d and then flows out from the second transition water outlet passage 9c; and the second transition water outlet passage 9c is directly in communication with the total water outlet passage 9a, and thus water can directly flow out from the total water outlet passage 9a. When water is to be turned off, it is only necessary to operate the water path switching valve to block the second transition water outlet passage 9c.

Figure 7:
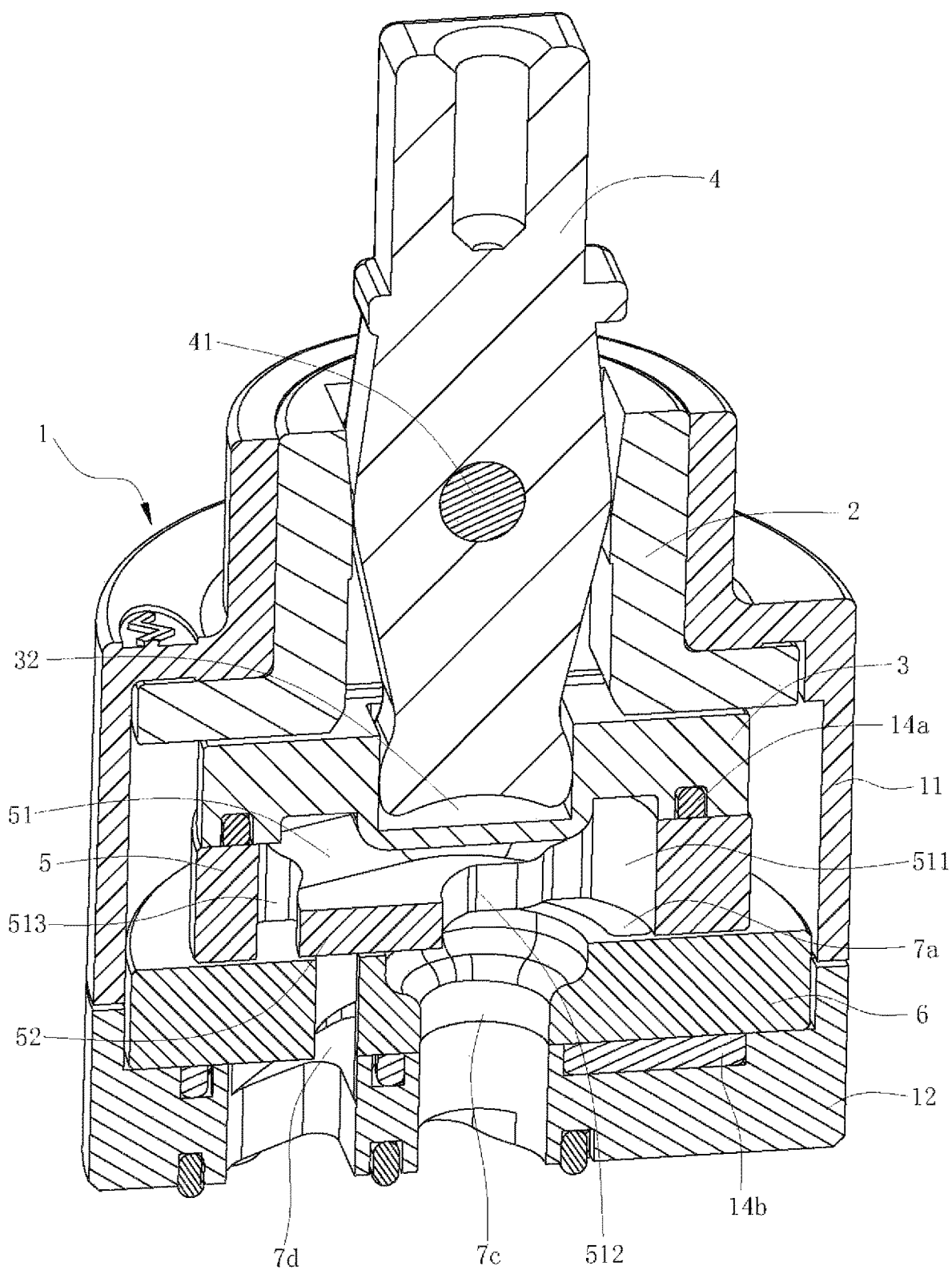
FIG. 7 is a sectional view of the water path switching valve core according to the embodiment of the present invention (in a state when a handle does not swing)
Figure 10:
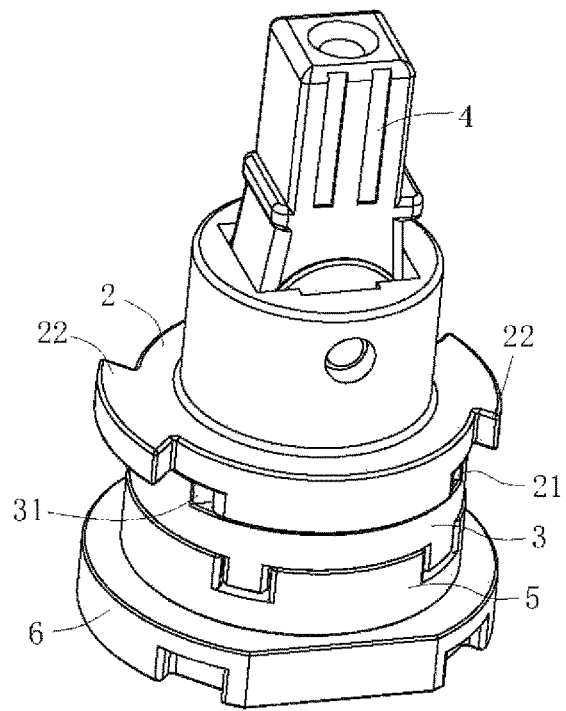
FIG. 10 is a perspective view of the water path switching valve core after a housing is removed according to the embodiment of the present invention (in a state when the handle does not swing)

The principle of the present water path switching valve core is described below:

as shown in FIGS. 7, 10 and 14, in a state in which the handle 4 does not swing back and forth and the dial 3 and the movable plate 5 are not driven to slide radially (that is, the handle 4 does not rotate by taking the pin shaft 41 as an axis), when the movable plate 5 is in a middle position state, the bottom surface of the movable plate 5 does not block the first inlet passage 7a and the second inlet passage 7b, and the bottom surface of the movable plate 5 blocks the communication between the second water mixing outlet 513 and the second outlet passage 7d; and at this position, mixed water passes through the water mixing chamber 51 and the first water mixing outlet 512, and then flows out from the first outlet passage 7c, and no water flows out from the second outlet passage 7d. The rotation of the movable plate 5 is capable of enabling the water mixing chamber 51 to be in communication with the first inlet passage 7a and/or the second inlet passage 7b, that is, the rotation of the movable plate 5 can adjust the temperature of the water flow.

Figure 9:
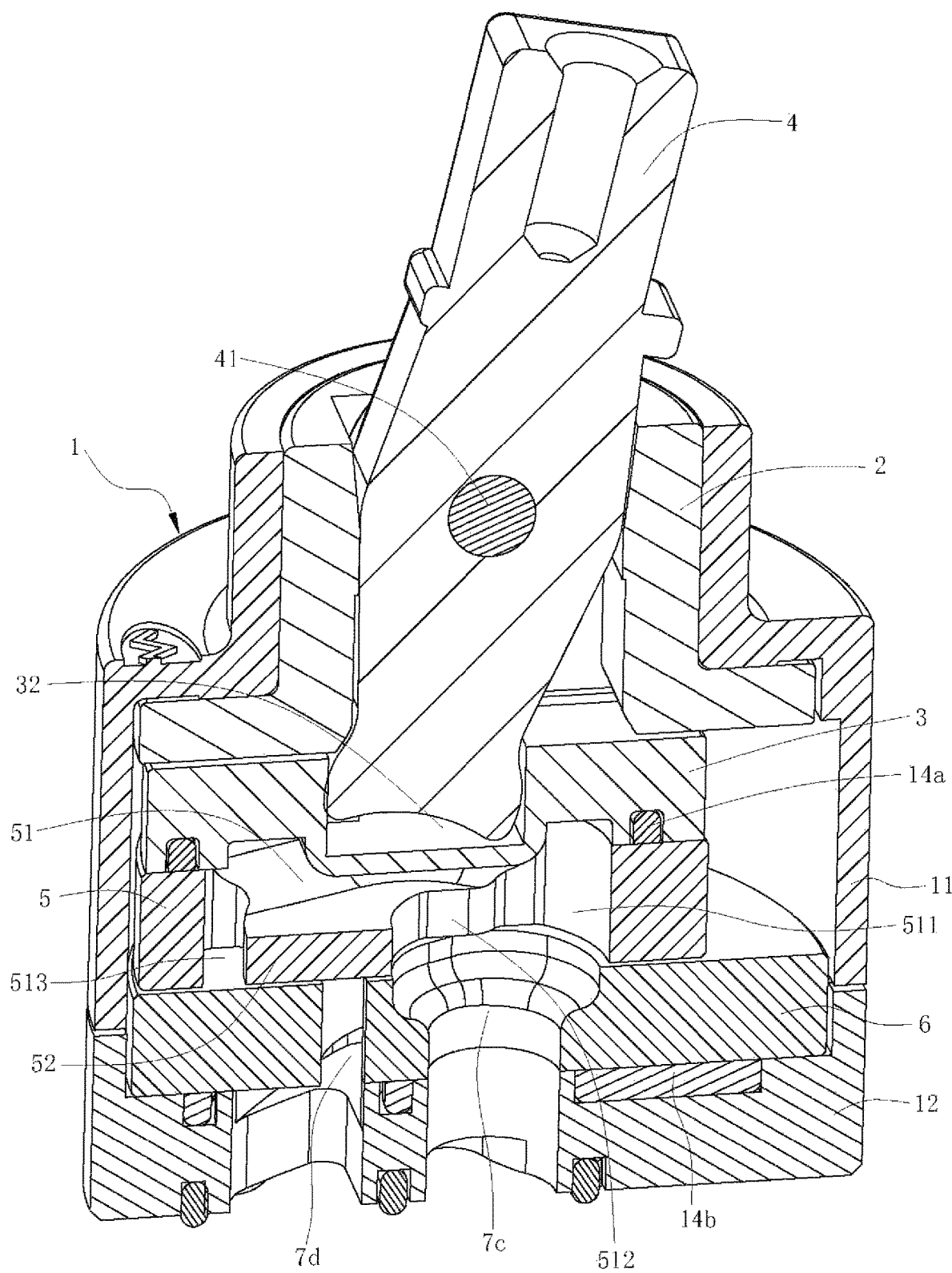
FIG. 9 is a sectional view of the water path switching valve core according to the embodiment of the present invention (in a state when the handle swings to the right)
Figure 12:
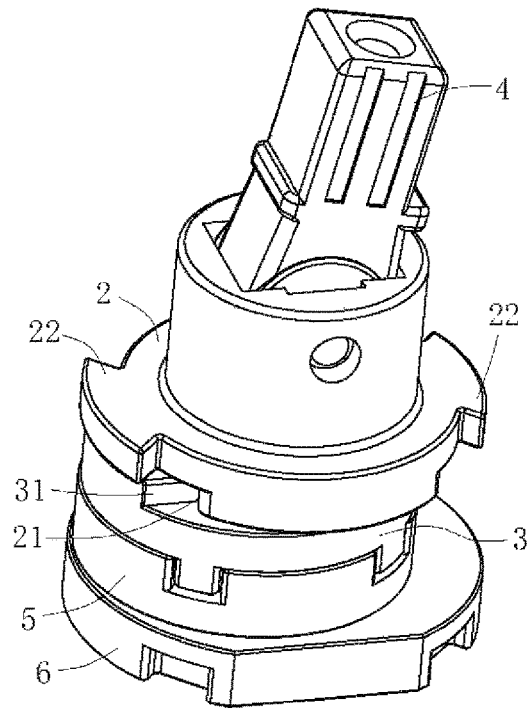
FIG. 12 is a perspective view of the water path switching valve core after the housing is removed according to the embodiment of the present invention (in a state when the handle swings to the right)
Figure 13:
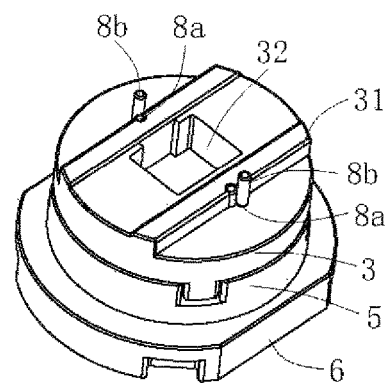
FIG. 13 is a perspective view of cooperation between a plurality of first columns and a plurality of second columns according to the embodiment of the present invention (in a state when the handle does not swing)
Figure 17:
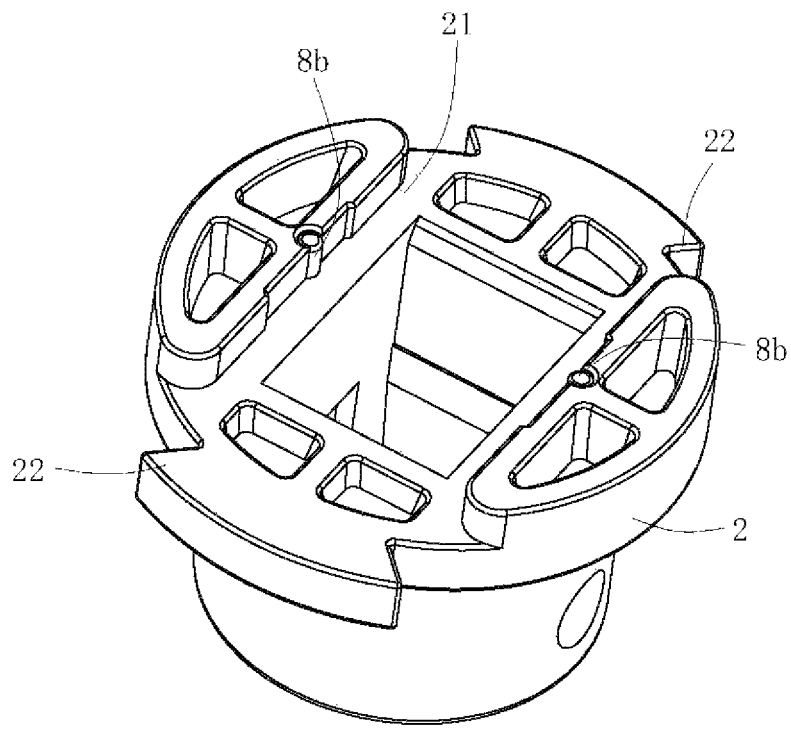
FIG. 17 is a perspective view of a rotor in the water path switching valve core according to the embodiment of the present invention.
Figure 18:
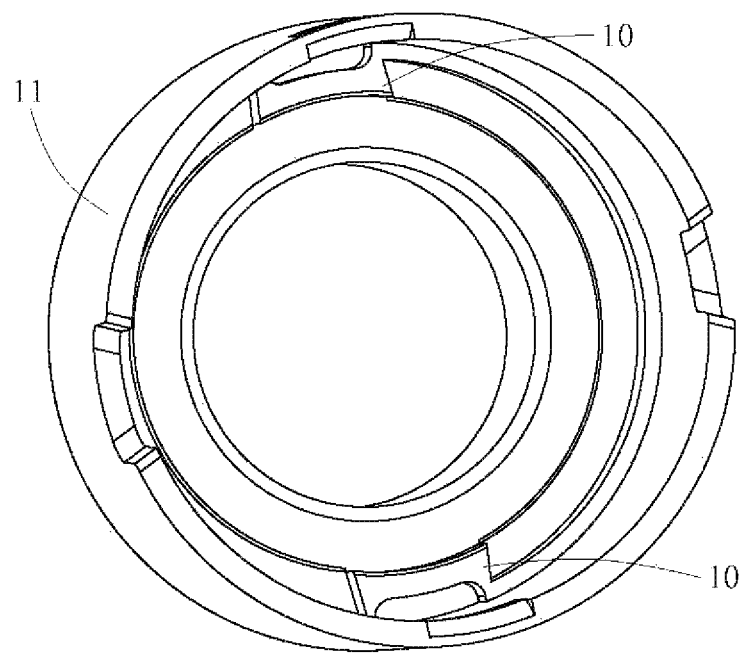
FIG. 18 is a perspective view of the housing in the water path switching valve core according to the embodiment of the present invention.
Figure 19:
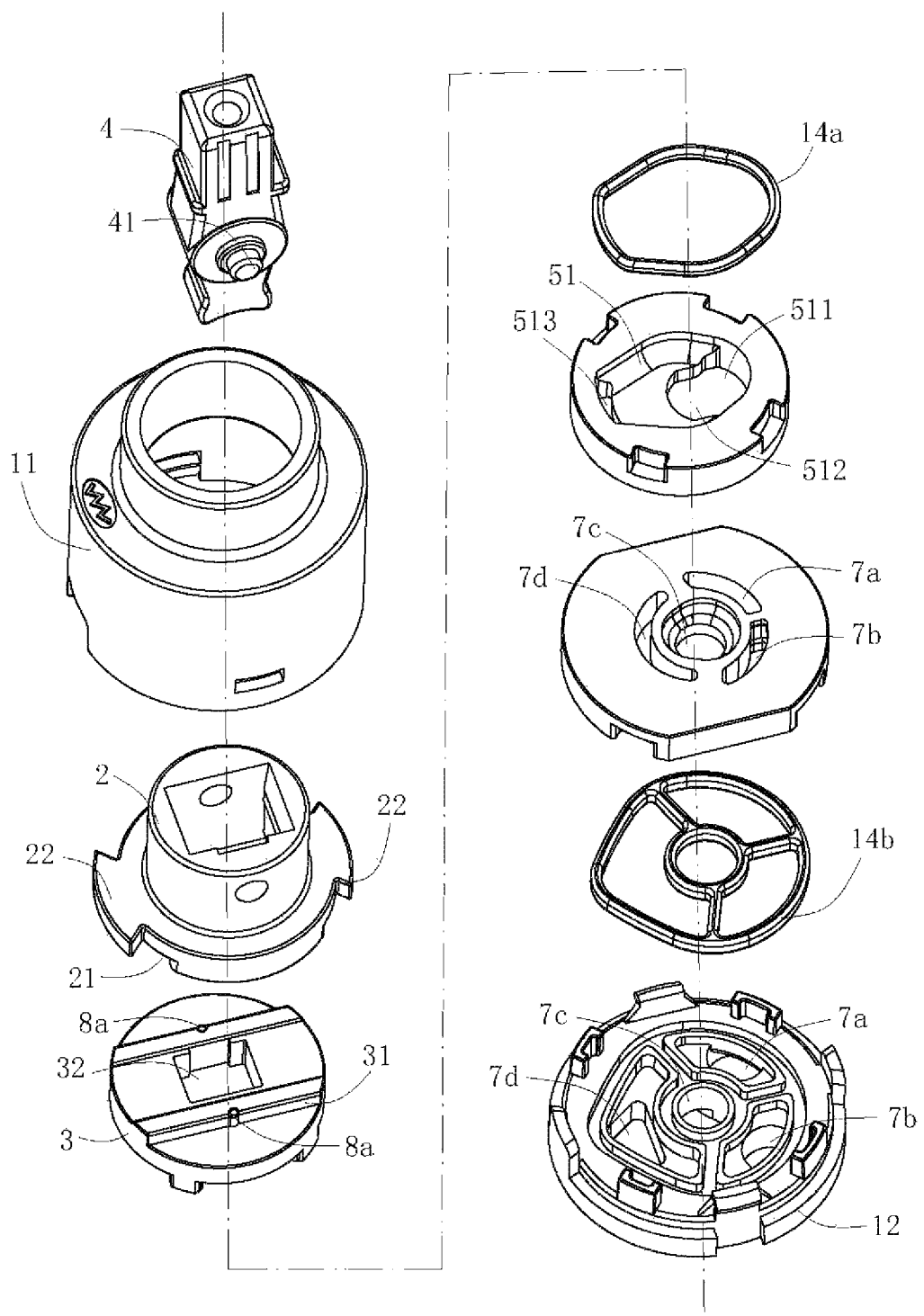
FIG. 19 is an exploded view of the water path switching valve core according to the embodiment of the present invention.

As shown in FIGS. 9, 12 and 16, in a state in which the handle 4 swings to the right to a maximum extent and drives the dial 3 and the movable plate 5 to slide radially to the left (that is, the handle 4 rotates by taking the pin shaft 41 as an axis), when the movable plate 5 slides from the middle position to one side direction (the left side in the direction shown in the figures), the bottom surface of the movable plate 5 blocks both the first inlet passage 7a and the second inlet passage 7b, and both the first inlet passage 7a and the second inlet passage 7b are blocked from the water mixing inlet 511, and therefore no water flows out from the first outlet passage and the second outlet passage, thereby being in a water flow turning-off state at this time.

Figure 8:
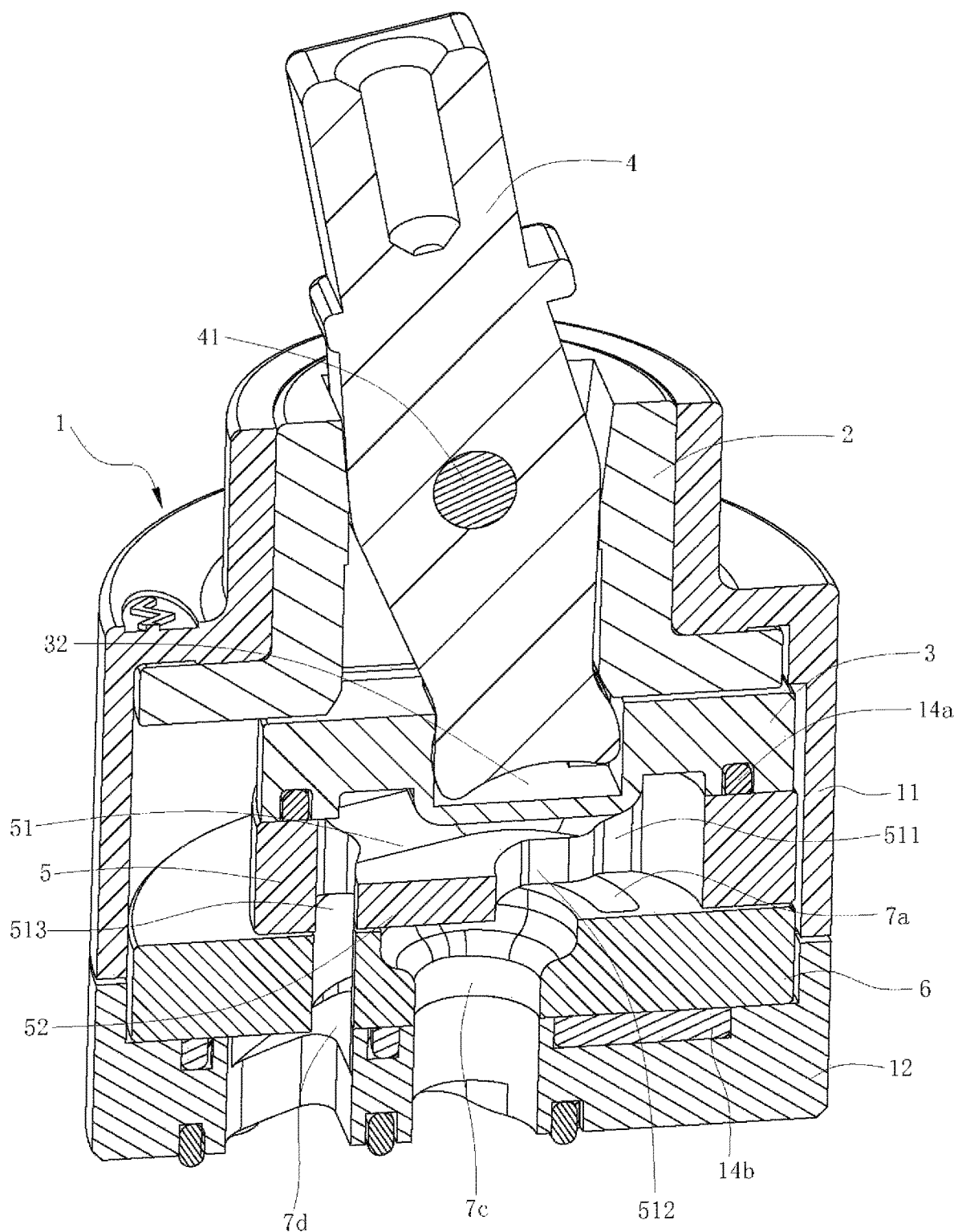
FIG. 8 is a sectional view of the water path switching valve core according to the embodiment of the present invention (in a state when the handle swings to the left)
Figure 11:
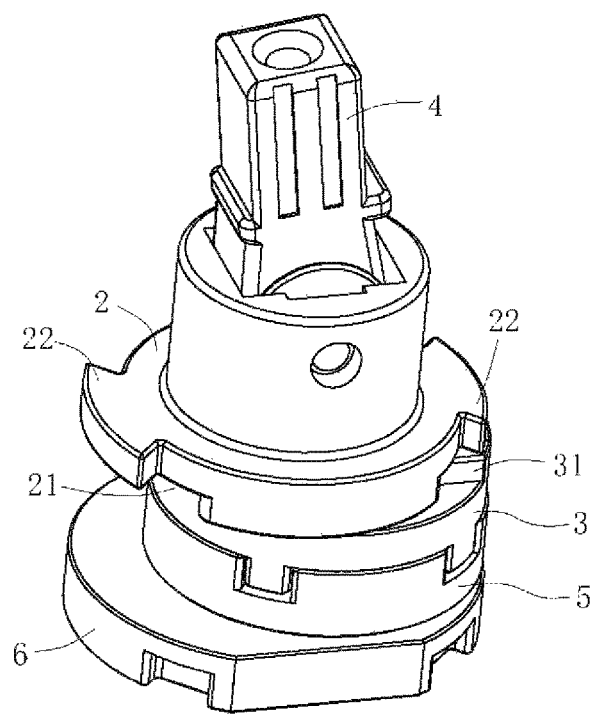
FIG. 11 is a perspective view of the water path switching valve core after the housing is removed according to the embodiment of the present invention (in a state when the handle swings to the left)

As shown in FIGS. 8, 11 and 15, in a state in which the handle 4 swings to the left to a maximum extent and drives the dial 3 and the movable plate 5 to slide radially to the right (that is, the handle 4 rotates by taking the pin shaft 41 as an axis), when the movable plate 5 slides from the middle position to the other side direction (the right side in the direction shown in the figures), the bottom surface of the movable plate 5 does not block the first inlet passage 7a and the second inlet passage 7b, the second water mixing outlet 513 is in communication with the second outlet passage 7d, and mixed water flows out from two paths, one path is to pass through the water mixing chamber 51 and the first water mixing outlet 512 and then to flow out from the first outlet passage 7c, and the other path is to pass through the water mixing chamber 51 and the second water mixing outlet 513 and then to flow out from the second outlet passage 7d. The rotation of the movable plate 5 is capable of enabling the water mixing chamber 51 to be in communication with the first inlet passage 7a and/or the second inlet passage 7b, that is, the rotation of the movable plate 5 can adjust the temperature of the water flow.

It is to be noted that, in the description of this embodiment, orientations or location relationships indicated by terms such as "front, behind", "left, right", "upper, lower" are the orientations and location relationships illustrated on the basis of the accompany drawings. Such terms are used just for ease of describing the present invention and simplifying the description, and it is not indicated or implied that the stated device or element must have a specific orientation or must be constructed and operated in the specific orientation, and shall not be interpreted as any limitation to the present invention. Terms "mounted", "connected to" and "connected with" should be understood in a broad sense. For example, the connection may be fixed connection or detachable connection or integral connection. The connection may be direct connection, or indirect connection with a mediator therebetween. The connection may be the communication between two elements. For a person of ordinary skill in the art, the specific meaning of the aforementioned terms in the present invention can be understood in specific circumstances.

The invention claimed is:

1. A valve core module, comprising a water path switching valve core and a core seat;
wherein the core seat comprises:
a base (9) with a total water outlet passage (9a), a first transition water outlet passage (9b) and a second transition water outlet passage (9c); and
an electric control switch (13) in communication with the first transition water outlet passage (9b) and the total water outlet passage (9a),
wherein
the second transition water outlet passage (9c) is in communication with the total water outlet passage (9a),
the electric control switch controls communication between the first transition water outlet passage (9b) and the total water outlet passage (9a);
wherein the water path switching valve core comprises a housing (1), a plurality of inlet passages, a first outlet passage (7c), a second outlet passage (7d);
a plurality of plates and a handle (4) for controlling the movement of the plates are disposed inside the housing (1), through operating the handle (4), a water flow is controlled to flow from the first water outlet passage (7c) and/or the second water outlet passage (7d);
the housing (1) is connected to the base (9) of the core seat, the first outlet passage (7c) is in communication with the first transition water outlet passage (9b), and the second outlet passage (7d) is in communication with the second transition water outlet passage (9c);
the base (9) has a mounting surface (91) on a top of the base (9), and the housing (1) is connected to the mounting surface (91);
the first transition water outlet passage (9b) and the second transition water outlet passage (9c) run through the mounting surface (91);
and the ends of the first water outlet passage (7c) and the second water outlet passage (7d) are located at the bottom surface of the housing (1);
the base (9) further has a plurality of initial water inlet passages, and the initial water inlet passages runs through the valve core mounting surface (91); and
an end of at least one of the plurality of inlet passages is located on the bottom surface of the housing (1), and the plurality of initial water inlet passages are in communication with the plurality of inlet passages;
the plurality of initial water inlet passages are composed of a first initial water inlet passage (9d) and a second initial water inlet passage (9e);
the plurality of inlet passages are composed of a first inlet passage (7a) and a second inlet passage (7b);
the first initial water inlet passage (9d) is in communication with the first inlet passage (7a), and the second initial water inlet passage (9e) is in communication with the second inlet passage (7b);
one of the plurality of plates has a water mixing chamber (51), and movement of the aforementioned one plate enables the water mixing chamber (51) to communicate with the first inlet passage (7a) and/or the second inlet passage (7b); and
wherein the water path switching valve core further comprises a rotor (2) and a dial (3) mounted in the housing (1), the plurality of plates comprises a movable plate (5) and a fixed plate (6);
the dial (3) is constrained at the bottom of the rotor (2) to rotate along with the rotor (2) and can slide relative to the rotor (2), the movable plate (5) is fixed on the bottom surface of the dial (3), and the fixed plate (6) is fixed on the bottom of the housing (1);
the first inlet passage (7a), the second inlet passage (7b), the first outlet passage (7c) and the second outlet passage (7d) are disposed on the bottom of the housing (1) and the fixed plate (6);
the movable plate (5) internally has the water mixing chamber (51), and the bottom surface of the movable plate (5) has a water mixing inlet (511), a first water mixing outlet (512) and a second water mixing outlet (513) in communication with the water mixing chamber (51);
the rotation of the movable plate (5) is capable of enabling the water mixing chamber (51) to communicate with the first inlet passage (7a) and/or the second inlet passage (7b) through the water mixing inlet (511);
the first water mixing outlet (512) is always in communication with the first water outlet passage (7c), the sliding of the movable plate (5) is capable of determining whether the second water mixing outlet (513) is in communication with the second water outlet passage (7d), and determining whether the movable plate (5) blocks the first inlet passage (7a) and the second inlet passage (7b).

2. The valve module of claim 1, wherein when the movable plate (5) is in a middle position state, the bottom surface of the movable plate (5) does not block the first inlet passage (7a) and the second inlet passage (7b), and the rotation of the movable plate (5) is capable of enabling the water mixing chamber (51) to be in communication with the first inlet passage (7a) and/or the second inlet passage (7b), and the bottom surface of the movable plate (5) blocks the communication between the second water mixing outlet (513) and the second outlet passage (7d);
when the movable plate (5) slides from the middle position to one side direction, the bottom surface of the movable plate (5) blocks both the first inlet passage (7a) and the second inlet passage (7b), and both the first inlet passage (7a) and the second inlet passage (7b) are blocked from the water mixing inlet (511);
when the movable plate (5) slides from the middle position to the other side direction, the bottom surface of the movable plate (5) does not block the first inlet passage (7a) and the second inlet passage (7b), and the rotation of the movable plate (5) is capable of enabling the water mixing chamber (51) to be in communication with the first inlet passage (7a) and/or the second inlet passage (7b), and enabling the second water mixing outlet (513) to be in communication with the second outlet passage (7d).

3. The valve module of claim 1, wherein the top surface of the dial (3) further has a guide boss (31), the bottom of the rotor (2) has a guide groove (21) matching the guide boss (31), and the guide boss (31) is disposed in the guide groove (21) and is capable of sliding therein;

a plurality of first columns (8*a*) having peripheral wall portions exposed are inserted onto a front wall and a rear wall of the guide boss (31), and a plurality of second columns (8*b*) having peripheral wall portions exposed are inserted onto a front inner wall and a rear inner wall of the guide groove (21);

the first columns (8*a*) need to pass over the second columns (8*b*), so that the movable plate (5) is capable of entering from one side position to the other side position.

\* \* \* \* \*